Figure 1:
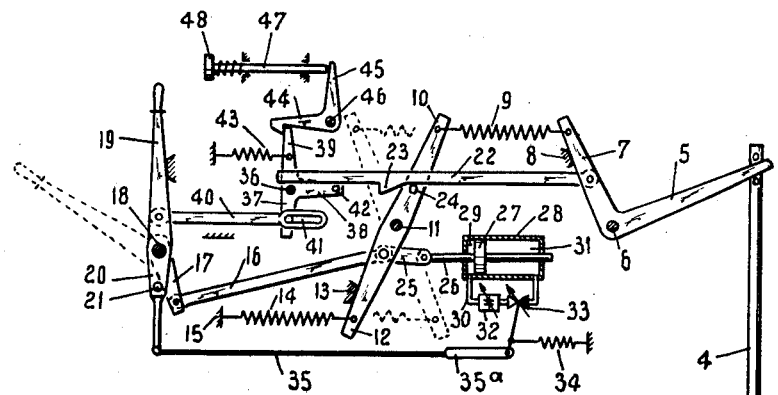

Nov. 6, 1962   H. A. HIDDE NIJLAND   3,062,934

DRIVING MECHANISMS FOR ELECTRIC CIRCUIT-BREAKERS

Filed Jan. 9, 1961

INVENTOR
HENDRIK A. HIDDE NIJLAND

BY *Imrie & Smiley*
Att'ys.

United States Patent Office 3,062,934
Patented Nov. 6, 1962

3,062,934
DRIVING MECHANISMS FOR ELECTRIC
CIRCUIT-BREAKERS
Hendrik A. Hidde Nijland, Laren, Netherlands, assignor to N.V. "COQ," Utrecht, Netherlands, a company of the Netherlands
Filed Jan. 9, 1961, Ser. No. 81,443
Claims priority, application Netherlands July 20, 1960
4 Claims. (Cl. 200—82)

The invention relates to a driving mechanism for an electric circuit-breaker, comprising a movable part which carries one or more switching contacts and is connected to a movable intermediate member through one or more switching-off springs and a locking device for keeping said springs in tensioned condition, said intermediate member being in its turn connected through one or more switching-on springs adapted to be kept in tensioned condition by a second locking device to a stationary part of the mechanism and being arranged for such movement against the force of the switching-on and the switching-off springs by hand or by a motor as to bring all springs in their tensioned condition simultaneously and both locking devices in their locking position, means for making the locking devices inoperative to control the circuit-breaker and a safety device which prevents that the intermediate member is driven back with a dangerously rapid free movement by all springs together from the position, in which said springs are tensioned, to the starting position, when in a first mentioned position of the intermediate member the locking device for the switching-off springs is released.

A driving mechanism of this construction is known, in which the locking device for the switching-on springs consists of a toggle joint lever and the safety device is formed as a hook which holds the intermediate member in the position, in which the springs are tensioned, when the locking device for the switching-off springs is prematurely released.

The invention has for its object to improve the known driving mechanism. It consists in that the safety device is a single-acting hydraulic cylinder provided with a piston which is in permanent cooperation with the intermediate member, the working space of said cylinder being connected to a liquid container through a conduit provided with a choke-opening which, if necessary, is adjustable. During the tensioning of the springs the volume of the working space is increased and liquid is sucked from the container. The choke-opening is so adjusted as to allow the circuit-breaker during its closing movement, when the intermediate member and also the piston are driven back to their starting positions by the switching-on springs, to reach the velocity required for the closing operation. If, however, the locking device for the switching-off springs is prematurely released, so that the intermediate member is drawn back towards the starting position with a free movement by all springs together, the choke-opening prevents that the velocity of the piston, that means also that of the intermediate member, exceeds a dangerous value.

The known safety hook would keep the intermediate member after a faulty manipulation in the position, in which all springs are tensioned, so that if one should wish after the springs have been tensioned to return the driving mechanism to its rest position when the circuit-breaker is still open and without closing same, it would be necessary first to remove the switching rods, then to repeat the operation for tensioning the driving mechanism, thereafter to release first the locking device for the switching-on springs and then that for the switching-off springs and finally to restore the switching rods.

Now, the invention makes this roundabout way superfluous, since the hydraulic safety device permits the intermediate member to be returned into its starting position with a free movement by all springs together. Consequently, if one should wish to undo the tensioning of the springs after the latter have been tensioned without the driving mechanism and perhaps also the circuit-breaker being first switched on and thereupon switched off, it is only necessary to release the locking device for the switching-off springs before that for the switching-on springs is made inoperative.

The hydraulic cylinder and its piston may also be used as locking device for the switching-on springs. To that end a check-valve is provided in the conduit having the choke-opening and means operable from the outside are used for keeping said check-valve open. An additional advantage thereof is that during tensioning of the springs also each intermediate position of the intermediate member is locked. If during tensioning the springs by hand one should let the hand lever inadvertently go the intermediate member remains in the intermediate position then attained.

It is also possible to use the hydraulic cylinder as motor for tensioning the springs. To that end the working space of the cylinder is also connected to the liquid container through a second conduit provided with a pump, whereas a normally closed valve is mounted in the conduit having the choke-opening and means are provided to open said valve, the arrangement being such as to permit the intermediate member being brought hydraulically into the position, in which the springs are tensioned by the cylinder and the piston, and to start the closing movement of the circuit-breaker by opening said valve.

If it should be desired to close the circuit-breaker immediately after the springs have been tensioned a snap-action device may be provided between the intermediate member and said valve, said snap-action device opening the valve with a blow just before the intermediate member has reached its position, in which the springs are tensioned, and closing the valve with a blow just before the intermediate member has been returned to its starting position.

Figure 2:
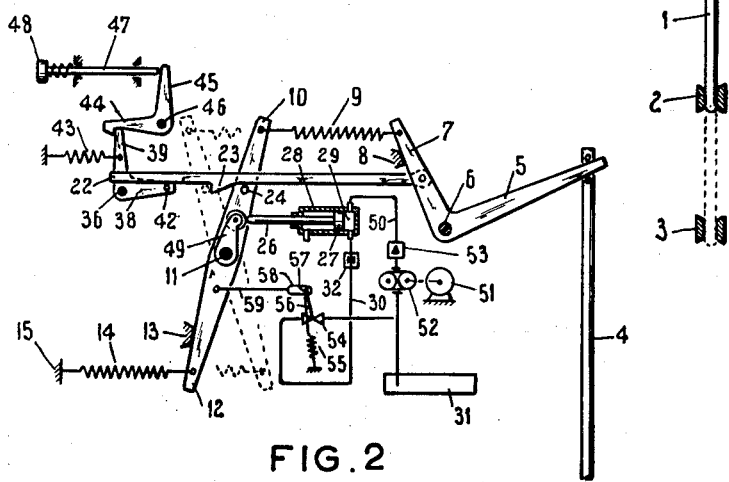

The invention will be hereinafter elucidated with the aid of the accompanying drawing. Therein is:

FIG. 1 a diagrammatic view of a driving mechanism according to the invention and operated by hand, and FIG. 2 a diagrammatic view of a variant of said driving mechanism operated by a motor.

In the drawing 1 is a switching rod adapted to be moved axially up and down and to cooperate with fixed switching contacts 2,3, to which may be connected in a way not shown the circuit to be closed or opened by the circuit-breaker. The switching rod 1 is connected through an insulator 4 to the arm 5 of the bell-crank 5,7 adapted to be rotated about the axis 6. In the off-position of the circuit-breaker (see the positions drawn in full lines) the arm 7 of the bell-crank 5,7 engages a stationary abutment 8. Said arm 7 is connected by one or more tension springs 9 to the arm 10 of a two-armed lever 10,12 adapted to be rotated about a shaft 11. This lever rests in the position shown in FIG. 1 with its arm 12 against a stationary abutment 13. The arm 12 is connected by one or more tension springs 14 to a stationary part 15 of the circuit-breaker.

The two-armed lever 10,12 constitutes an intermediate member adapted to be operated by means of a driving mechanism. This mechanism consists in FIG. 1 of a rod 16, an arm 17 mounted for rotation about the axis 18 and a hand lever 19,20 which is also mounted for rotation about the axis 18 and of which the arm 20 may be brought into engagement with the arm 17 by means of a stud 21.

The arm 7 of the bell-crank 5,7 is also provided with a locking bar 22 having a stop 23 adapted to cooperate with a stud 24 provided on the arm 10 of the intermediate member 10,12.

In order to tension the springs of the driving mechanism, so that the circuit-breaker may be closed and thereafter opened again, the hand lever 19,20 is rotated counterclockwise. Thereby the arm 17 is moved together with the hand lever and the intermediate member 10,12 is also rotated counterclock-wise about the shaft 11 by the rod 16 so that the springs 9 as well as the springs 14 are tensioned (see the positions drawn in dotted lines). When the intermediate member 12 has reached the position, in which the springs 9,14 are tensioned, the locking bar 22 engages with its stop 23 the pin 24 and the switching-off springs 9 are locked in tensioned condition.

The intermediate member 10,12 is also connected by means of a link 25 with the rod 26 of a piston 27 mounted for reciprocation in a hydraulic cylinder 28. This cylinder has actually only one working space 29, which during the tensioning operation of the springs, that means during the counterclock-wise rotation of the intermediate member 10,12, sucks liquid through a conduit 30 from a container which in the present case is the second cylinder space 31.

Provided in the conduit 30 are an adjustable choke-opening 32 and a check valve 33 which is operable from the outside. The check-valve is brought by a spring into a condition, in which it only permits liquid to flow towards the working space 29. However, said valve can be so controlled by means of a rod 35 having a slot 35a and connected with the arm 20 of the hand lever 19,20 as to permit the liquid to flow also in the opposite direction. Just before the hand lever 19,20 has reached its starting position, the check-valve 33 is opened to allow the liquid to flow in the opposite direction.

When the hand lever 19,20 is rotated counterclockwise the springs are tensioned, the volume of the working space 29 is increased and the valve 33 operates as check-valve, so that if one should let go the lever 19 the intermediate member 10,12, the piston 27 and the springs will remain in their just attained positions. Thus a separate locking device for the switching-on springs is superfluous. If the hand lever 19 is rotated clockwise to its starting position, the check-valve 33 is pushed open just before said starting position has been reached and the switching rod 1 is moved so as to close the circuit-breaker by the switching-on springs 14. In the open condition the check-valve 33 has a very wide aperture so that the velocity of the closing operation is exclusively determined by the aperture of the choke-opening 32.

If the circuit-breaker must be reopened after it has been closed it is necessary to lift the locking bar 22 so that the switching-off springs are released and the bell-crank 5,7 carrying the switching rod 1 is returned into its starting position against the fixed abutment 8 by said springs. The lifting of the locking bar 22 is effected, in the illustrated embodiment, by means of an auxiliary device consisting of a three-armed lever 37,38,39 mounted for rotation about an axis 36, of which the arm 37 is connected by a rod 40 having a slot 41 to the hand-lever 19,20, the arm 38 engages the lower side of the bar 22 by means of a pin 42 and the arm 39 is loaded by a tension spring 43 and cooperates with a pawl-lever 44,45 mounted for rotation about the axis 46 and adapted to be released by means of a rod 47 provided with a push-button 48. If the circuit-breaker is to be opened one needs only to push the button 48. Then the pawl 44 is lifted, so that the lever 37,38,39 is rotated counterclock-wise by the spring 43, the bar 22 is lifted by the pin 42 and the locking of the tensioned switching-off springs 9 is undone. During the counterclock-wise movement of the hand lever 19,20 the three-armed lever 37,38,39 is rotated clockwise, the spring 43 is tensioned, the end of the arm 39 is caught by the pawl 44 and the pin 42 of the arm 38 is lowered so much as to allow the locking-bar 22 to engage with its stop 23 the pin 24 of the intermediate bar 10,12, as soon as the springs 9 and 14 are tensioned.

When the off-button 48 is pushed before the hand-lever 19,20 is returned into the starting position, at first nothing will happen. However, as soon as the hand-lever 19,20 has reached the starting position the check-valve 33 is opened and the intermediate member 10,12 is drawn towards its starting position with a free movement by all springs together. The choke-opening 32 then limits the velocity with which the intermediate member performs its free stroke. This velocity is only slightly greater than the velocity during the closing operation of the circuit-breaker and remains below a dangerous value. This device makes it possible to release the springs without the necessity of first closing and thereupon re-opening the circuit-breaker.

The check-valve 33 is not necessary. The rod 16 and the arm 17 may be constructed as a toggle joint lever which constitutes a locking device for the switching-on springs.

In the embodiment shown in FIG. 2 the hydraulic cylinder 28 is also used for tensioning the springs. To that end the piston 27 acts on an arm 49 attached to the shaft 11 of the intermediate member 10,12 and the working space 29 of the cylinder 28 is not only connected to the liquid container 31 by the conduit 30 having the choke-opening 32 but also by a conduit 50 provided with a pump 52 driven by an electromotor 51 and with a check-valve 53. The conduit 30 is normally closed by a valve 54 which is moved with snap-action by a tumbling spring 55 connected to the operating arm 56 of said valve. This arm is connected through a free-stroke coupling 57,58 to a rod 59 secured to the intermediate member 10,12.

If in this case the circuit-breaker has to be closed the electromotor 51 is started. This motor drives the pump 52 so that liquid is pumped into the working space 29 of the cylinder 28, the piston 27 is forced to the left and the intermediate member 10,12 is moved into a position, in which all springs are tensioned. Just before the tensioned condition has been reached the rod 59 moves the operating arm of the valve 54 to the right, so that after passing the unstable position the spring 55 swings the arm 56 with a sudden movement further to the right and valve 54 is suddenly opened. The circuit-breaker is thereupon closed by the switching-on springs 14. The returning piston 27 forces the liquid through the choke-opening 32 back into the container 31, so that the velocity of the closing operation is limited. During the closing operation the axis 11 and the intermediate member 10,12 are returned and the valve 54 is suddenly closed by the spring 55 about when the intermediate member has again reached its starting position.

What I claim is:

1. A driving mechanism for an electric circuit-breaker, comprising in combination a movable part, at least one switching contact carried by said movable part, an intermediate member movable between a start position and an end position, at least one switching-off spring, a locking device for keeping said spring in tensioned condition, means to release said locking device, said switching-off spring and said locking device being mounted between the movable part of the circuit-breaker and the intermediate member, at least one switching-on spring, said switching-on spring being mounted between the intermediate member and a stationary part of the circuit-breaker, an operating member acting on the intermediate member and adapted to bring all springs in their tensioned condition simultaneously and the locking device in its locking position by moving said intermediate member to said end position against the forces of all springs, a single acting hydraulic cylinder, a piston mounted for reciprocation in said cylinder, said piston being in permanent cooperation with the intermediate member, a liquid container, a liquid connection between said container and the working space of said cylinder and including a choke-opening and a check-valve, said check-valve preventing liquid to flow from the working space of the cylinder into said container during the movement of the intermediate member toward its end position for tensioning the springs, and means for inactivating the check-valve as soon as the intermediate member has reached the said end position, said cylinder, piston, container, liquid connection, choke-opening and check-valve constituting together a safety device which prevents the intermediate member from being driven back from its end position toward its start position with a dangerously rapid free movement by all springs should in the first mentioned position of the intermediate member the locking device be released.

2. A driving mechanism as claimed in claim 1 wherein said operating member is operable by hand and mounted for reciprocating movement, said mechanism additionally comprising means coupling said operating member with the intermediate member, and means connecting said operating member to the check-valve, said coupling means being so constructed as to be active only during movement of the operating member from an initial position to bring the intermediate member to said end position in which the springs are tensioned, and said connecting means being so constructed as to push the check-valve open just before the operating member has again reached its initial position during its return stroke.

3. A driving mechanism as claimed in claim 1 wherein said liquid connection includes two conduits connected in parallel between the working space of the cylinder and the liquid container, said mechanism additionally comprising a pump provided in series with said check-valve in one of said conduits, a normally closed auxiliary valve provided in series with said choke-opening in the other of said conduits, and means connecting the intermediate member to said auxiliary valve, the arrangement being such that the action of the pump on the piston contained in the cylinder hydraulically brings the intermediate member into said end position in which the springs are tensioned and opens said auxiliary valve, whereby the closing movement of the circuit-breaker is started just before the intermediate member has reached its end position.

4. A driving mechanism as claimed in claim 3 further comprising a snap-action device, said snap-action device forming part of the means connecting the intermediate member and the auxiliary valve, said device opening the valve with a blow just before the intermediate member has reached its end position and closing the valve with a blow just before the intermediate member has been returned to its starting position.

References Cited in the file of this patent
UNITED STATES PATENTS

| | | |
|---|---|---|
| 2,784,270 | Hidde Nijland | Mar. 5, 1957 |
| 2,810,808 | Coggeshall | Oct. 22, 1957 |